US009305370B2

(12) United States Patent
Singh

(10) Patent No.: US 9,305,370 B2
(45) Date of Patent: Apr. 5, 2016

(54) GRAPHICAL RENDERING WITH IMPLICIT SURFACES

(71) Applicant: QUALCOMM Incorporated, San Diego, CA (US)

(72) Inventor: Jag Mohan Singh, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 15 days.

(21) Appl. No.: 14/193,139

(22) Filed: Feb. 28, 2014

(65) Prior Publication Data

US 2015/0035854 A1 Feb. 5, 2015

(30) Foreign Application Priority Data

Jul. 31, 2013 (IN) ........................... 3443/CHE/2013

(51) Int. Cl.

| | |
|---|---|
| ***G09G 5/00*** | (2006.01) |
| ***G06T 11/00*** | (2006.01) |
| ***G06T 15/06*** | (2011.01) |
| ***G06T 17/10*** | (2006.01) |

(52) U.S. Cl.

CPC ................. *G06T 11/00* (2013.01); *G06T 15/06* (2013.01); *G06T 17/10* (2013.01)

(58) Field of Classification Search

None

See application file for complete search history.

(56) References Cited

U.S. PATENT DOCUMENTS

| | | |
|---|---|---|
| 5,402,532 A | 3/1995 | Epstein et al. |
| 7,408,548 B2 | 8/2008 | Guenter et al. |
| 8,483,858 B2 | 7/2013 | Sullivan et al. |
| 2011/0026826 A1 | 2/2011 | Euler |
| 2012/0169728 A1 | 7/2012 | Mora |
| 2012/0182297 A1 | 7/2012 | Hanniel et al. |

OTHER PUBLICATIONS

T.F Wiegand ("Interactive Rendering of CSG Models"). IEEE, vol. 15, 1996.*

Singh et al. ("Real-Time Ray Tracing of Implicit Surfaces on the GPU"), IEEE. vol. 16, Mar. 2010.*

Singh et al. ("Real Time Rendering of Implicit Surfaces on the GPU"), gpucomputing.net, 2008.*

Atherton "A Scan-line Hidden Surface Removal Procedure for Constructive Solid Geometry," in Proceedings of SIGGRAPH 1983, ACM Press / ACM SIGGRAPH, Jul. 1983. pp. 73-82.

Goldfeather, et al., "Near Real-time CSG Rendering using Tree Normalization and Geometric Pruning," IEEE Computer Graphics and Applications, vol. 9, Mar. 1989, pp. 20-28.

Guha, et al., "Application of the two-sided depth test to CSG Rendering," in Proceedings of the 2003 symposium on Interactive 3D Graphics. ACM, Jan. 2003, pp. 177-180.

(Continued)

*Primary Examiner* — Ming Hon

*Assistant Examiner* — Khoa Vu

(74) *Attorney, Agent, or Firm* — Shumaker & Sieffert, P.A.

(57) ABSTRACT

Techniques are described for rendering objects formed by implicit surfaces using ray-tracing, where each implicit surface is defined by a surface equation. The techniques utilize presence of real-roots to determine which implicit surfaces are intersected by a ray. If all implicit surfaces classified as uncomplemented surfaces intersect the ray, and none of the implicit surfaces classified as completed surfaces intersect the ray, the techniques determine a maximum from among a set of real-root values of the surface equations for the uncomplemented surfaces to determine an intersection point of the ray. The techniques utilize the intersection point for further processing such as per-pixel color and depth processing.

24 Claims, 5 Drawing Sheets

(56) References Cited

OTHER PUBLICATIONS

Hable, et al., "Blister: GPU-based Rendering of Boolean Combinations of free-form Triangulated Shapes," ACM Trans. Graph. vol. 24, No. 3, Jul. 2005, pp. 1024-1031.
Hanrahan, "Ray Tracing Algebraic Surfaces", Computer Graphics, ACM, US, vol. 17, No. 3, Jul. 1983, XP000900938, ISSN: 0097-8930, pp. 86-90.
International Search Report and Written Opinion—PCT/US2014/047617—ISA/EPO—Feb. 26, 2015, pp. 15.
Mazzetti, et al., "Computing CSG Tree Boundaries as Algebraic Expressions," in Proceedings of the ACM Symposium on Solid Modeling and Applications (SMA). ACM Press, Jan. 1993, pp. 155-162.
Ranta, et al., "GPU Objects," in Proceedings of the 5th Indian Conference on Computer Vision, Graphics and Image Processing, ser. ICVGIP'06. Springer-Verlag, Dec. 2006, pp. 352-363.
Rappoport, et al.,"Interactive Boolean Operations for Conceptual design of 3-D Solids," in Proceedings of SIGGRAPH 1997. ACM Press / ACM SIGGRAPH, Aug. 3-8, 1997, pp. 269-278.
Roth, "Ray Casting for Modeling Solids", Computer Graphics and Image Processing, Academic Press, New York, US, vol. 18, No. 2, Feb. 1982, XP000561900, pp. 109-144.
Singh, et al., "Real-time Ray Tracing of Implicit Surfaces on the GPU," IEEE Transactions on Visualization and Computer Graphics, vol. 16. Mar. 2010, pp. 261-272.
Tunjic, "Computer Graphics on Mobile Devices," Vienna University of Technology, 2012, retrieved on Jan. 30, 2014, pp. 1-11.
Wiegand, "Interactive Rendering of CSG Models", Computer Graphics Forum, vol. 15, No. 4, Oct. 1996, XP055168598, ISSN: 0167-7055, DOI: 10.1111/1467-8659.1540249, pp. 249-261.
Wyvill, et al., "Extending the CSG Tree. Warping, Blending and Boolean Operations in an implicit Surface Modeling System," Computer Graphics Forum, vol. 18, No. 2, 1999, pp. 149-158.
Second Written Opinion from International Application No. PCT/US2014/047617, dated Jul. 14, 2015, 7 pps.
International Preliminary Report on Patentability from International Application No. PCT/US2014/047617, dated Nov. 2, 2015, 9 pp.

* cited by examiner

GRAPHICAL RENDERING WITH IMPLICIT SURFACES

This application claims the benefit of Indian Provisional Application No. 3443/CHE/2013, filed Jul. 31, 2013, the content of which is incorporated herein by reference in its entirety.

TECHNICAL FIELD

This disclosure relates to rendering of graphical implicit surfaces, and more particularly, to rendering graphical implicit surfaces with a graphics processing unit (GPU).

BACKGROUND

Constructive solid geometry (CSG) refers to graphics modeling in which surfaces are combined using Boolean operations to form a final object (referred to as the CSG object) that is to be rendered. In some examples, the surfaces used to construct the CSG object are implicit surfaces. An implicit surface is a surface defined by polynomial equations, rather than interconnections of polygons (e.g., triangles).

SUMMARY

In general, the disclosure describes ray-tracing techniques for graphical rendering of constructive solid geometry (CSG) objects by identifying intersection points based on the presence of real-roots in the equations that define implicit surfaces used to the form the CSG objects. The GPU may determine that implicit surfaces whose equations have only real-roots (e.g., positive real-roots) intersect the ray used in ray-tracing. In some examples, the GPU may determine the maximum of the real-roots to determine the ray intersection point. The GPU may identify the pixel at the ray intersection point for rendering purposes.

In one example, the disclosure describes a method of rendering graphical objects or shapes, the method comprising determining which surface equations of a plurality of surface equations for respective ones of a plurality of implicit surfaces have real-root values, wherein a real-root value for each of the respective surface equations is a value that includes no imaginary component that when substituted into the respective surface equations causes the result of the respective surface equations to equal zero, and wherein the plurality of implicit surfaces together form a graphical object or shape, determining an intersection point of a ray associated with a pixel with the graphical object or shape based on the determination of which surface equations have real-root values, and rendering the pixel based on the determined intersection point.

In one example, the disclosure describes a device for rendering graphical objects or shapes, the device comprising a memory configured to store a plurality of surface equations for respective ones of a plurality of implicit surfaces, wherein the plurality of implicit surfaces together form a graphical object or shape, and a graphics processing unit (GPU) configured to determine which surface equations have real-root values, wherein a real-root value for each of the respective surface equations is a value that includes no imaginary component that when substituted into the respective surface equations causes the result of the respective surface equations to equal zero, determine an intersection point of a ray associated with a pixel with the graphical object or shape based on the determination of which surface equations have real-root values, and render the pixel based on the determined intersection point.

In one example, the disclosure describes a computer-readable storage medium having instructions stored thereon that when executed cause a graphics processing unit (GPU) to determine which surface equations of a plurality of surface equations for respective ones of a plurality of implicit surfaces have real-root values, wherein a real-root value for each of the respective surface equations is a value that includes no imaginary component that when substituted into the respective surface equations causes the result of the respective surface equations to equal zero, and wherein the plurality of implicit surfaces together form a graphical object or shape, determine an intersection point of a ray associated with a pixel with the graphical object or shape based on the determination of which surface equations have real-root values, and render the pixel based on the determined intersection point.

In one example, the disclosure describes device for rendering graphical objects or shapes comprising a graphics processing unit (GPU), the GPU comprising means for determining which surface equations of a plurality of surface equations for respective ones of a plurality of implicit surfaces have real-root values, wherein a real-root value for each of the respective surface equations is a value that includes no imaginary component that when substituted into the respective surface equations causes the result of the respective surface equations to equal zero, and wherein the plurality of implicit surfaces together form a graphical object or shape, means for determining an intersection point of a ray associated with a pixel with the graphical object or shape based on the determination of which surface equations have real-root values, and means for rendering the pixel based on the determined intersection point.

The details of one or more examples are set forth in the accompanying drawings and the description below. Other features, objects, and advantages will be apparent from the description and drawings, and from the claims.

DETAILED DESCRIPTION

Figure 1:
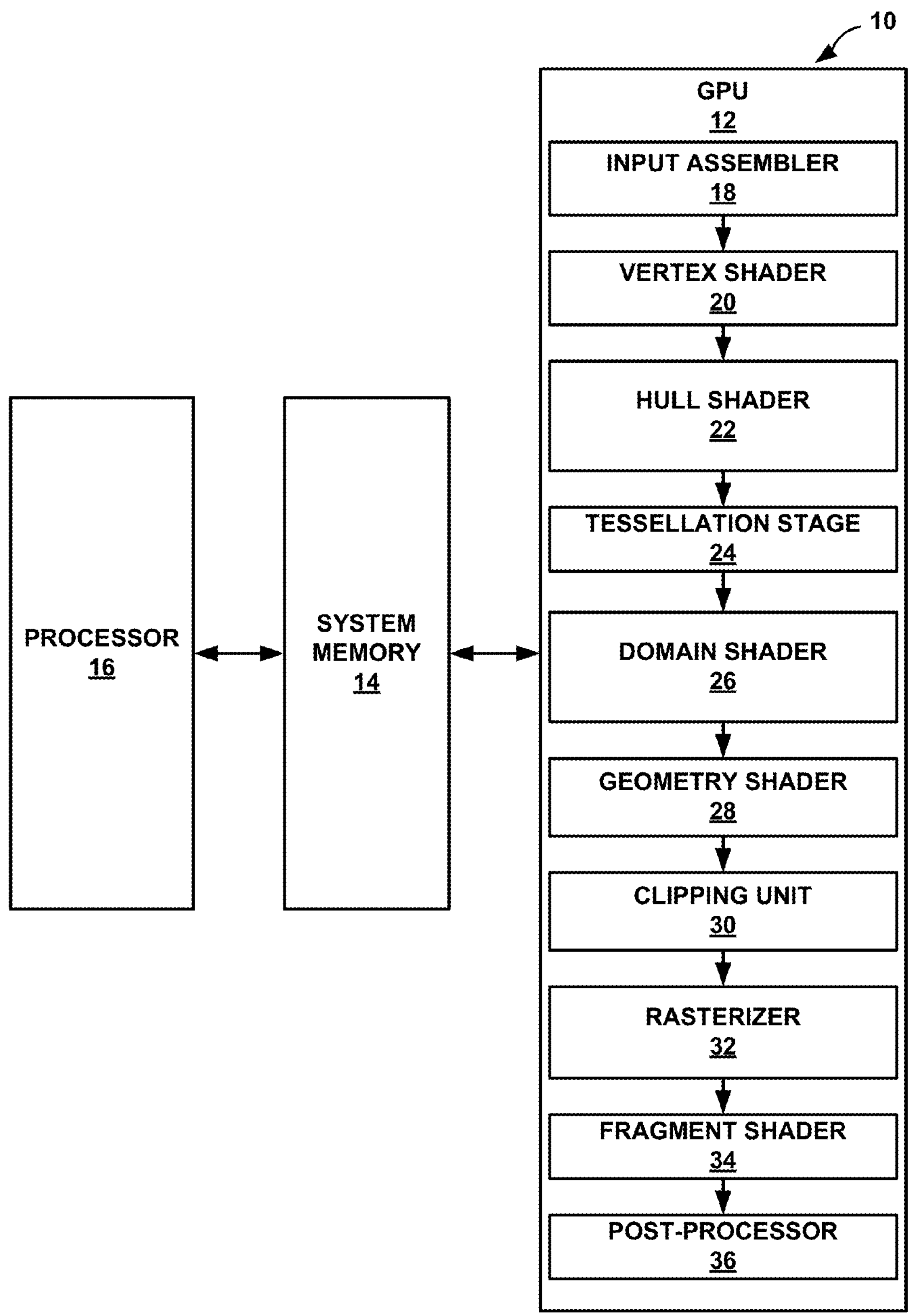
FIG. 1 is a block diagram illustrating a device that implements graphics rendering in accordance with one or more examples described in this disclosure.

The techniques described in this disclosure are directed to graphical rendering of objects formed from implicit surfaces by a graphics processing unit (GPU). In some cases, the GPU implements primitive processing (e.g., triangulation) for rendering complex shapes. In these cases, the GPU divides a complex shape into a plurality of primitives (e.g., triangles or other polygons) and processes each primitive for rendering the complex image. The GPU uses rasterization to render the primitives that form the complex shapes.

Another technique to form complex shapes or objects includes using equations to define surfaces that together form the complex shapes or objects. A surface that is defined using equations is referred to as an implicit surface. A fixed-function pipeline of the GPU may not be able to process the implicit surface and, in some cases, uses primitives to form the implicit surfaces. However, using primitives to form implicit surfaces reduces resolution and increases computational complexity, and in general, negates the benefits of defining shapes or objects using implicit surfaces.

To exploit the benefits of implicit surfaces, the techniques described in this disclosure utilize ray-tracing techniques to achieve visually rich renderings. In one example, a fragment shader, executing on the GPU, implements the ray-tracing techniques. GPUs have become more programmable with vertex shaders, fragment shaders, geometry shaders, and tessellation shaders, as a few programmable components. In the techniques described in this disclosure, the fragment shader may be configured to implement normal rendering functions when graphical shapes or objects are defined using an interconnection of primitives (e.g., triangles) and configured to implement ray-tracing techniques when graphical shapes or objects are defined using implicit surfaces. For example, the fragment shader may determine where a ray intersects an implicit surface, and the intersection point is then used for depth testing to identify pixels that are to be displayed.

While ray-tracing to render implicit surfaces may provide visually richer graphical shapes and objects, ray-tracing may require more processing time to render as compared to rasterization. The techniques described in this disclosure increase the speed at which the GPU can implement ray-tracing to render implicit surfaces (i.e., reduce the processing time to render implicit surfaces).

For example, the techniques described in this disclosure utilize constructive solid geometry (CSG) techniques. CSG refers to graphics modeling in which implicit surfaces are combined using Boolean operations to form a final object (referred to as the CSG object) that is to be rendered. As described above, an implicit surface is a surface defined by polynomial equations, rather than interconnections of polygons (e.g., triangles). For example, a processor defines a CSG object by a plurality of implicit surfaces combined together using Boolean expressions. Each of the implicit surfaces is defined by a respective surface equation.

In the techniques described in this disclosure, the GPU may classify each of the implicit surfaces as a complemented surface or an uncomplemented surface. A complemented surface is a surface that is subtracted and an uncomplemented surface is a surface from which another surface is subtracted. In other words, a CSG object could be formed from complemented surfaces subtracted from uncomplemented surfaces.

The GPU may determine the presence of real-roots, and in some examples positive real-roots, for the surface equations for each of the implicit surfaces (e.g., for both the complemented and uncomplemented surfaces). A root of a surface equation is the value of the variable of the surface equation when the surface equation is set equal to zero. A real-root is a non-imaginary root value. For instance, the roots of a quadratic equation may be two real values, two imaginary values, or one real value if the quadratic equation is a perfect square. There may be similar root values (i.e., real-roots and imaginary-roots) for polynomial equations with polynomials greater than two. The GPU may determine the presence of the real-roots for the surface equations of the implicit surfaces using one of a variety of techniques such as discriminant analysis or a root isolation adaptive marching points technique, and the techniques described in this disclosure are not limited to any particular technique used to determine the presence of real-roots.

The presence of real-roots is indicative of whether a ray used in ray-tracing techniques intersects the implicit surface. Therefore, by determining the presence of real-roots for surface equations for respective implicit surfaces, the GPU may determine whether a ray intersects a particular implicit surface. In the techniques described in this disclosure, the GPU may determine if a ray intersects all of the uncomplemented surfaces, and does not intersect any of the complemented surfaces, as indicated by the presence of real-roots analysis.

If the GPU determines that a ray intersects all of the uncomplemented surfaces and none of the complemented surfaces, the GPU may determine a maximum root value of the roots of the complemented surfaces. In some examples, the GPU may identify a minimum of the roots of each of the surface equations, and then determine the maximum among the identified minimum roots. For example, assume there are two uncomplemented surfaces that intersect the ray and are quadratic equations. In this example, the surface equation for the first uncomplemented surface will have two real roots and the surface equation for the second uncomplemented surface will have two real roots. The GPU may identify the minimum between the two real roots for the surface equation of the first uncomplemented surface and the minimum between the two real roots for the surface equation of the second uncomplemented surface. The GPU may then determine which of the two identified roots (i.e., one from the surface equation for first uncomplemented surface and one from the surface equation of the second uncomplemented surface) is greater (i.e., the maximum).

The GPU may utilize the resulting maximum root value as the intersection point of the ray. The GPU may further use the intersection point of the ray to compute per-pixel color and depth as part of the rendering process generally implemented by the fixed-function pipeline of the GPU. In this way, the techniques described in this disclosure accelerate the rendering process for CSG objects. For example, by determining whether the roots are real or imaginary for uncomplemented and complemented surfaces, respectively, it is possible for the GPU to determine only the maximum of roots for the uncomplemented surfaces to determine the intersection point for per-pixel color and depth.

Other ray-tracing techniques for CSG did not recognize any benefits associated with determining whether roots are real or imaginary for surfaces, and therefore had to rely on a sorting algorithm of possible intersection points for all surfaces to determine the actual intersection point of the ray. Such a sorting algorithm may be processing extensive and delay the rendering. By exploiting the presence of real-roots analysis, the techniques described in this disclosure may not need to perform any sorting and may be able to determine the maximum root values for determining intersection points to identify pixels for rendering.

FIG. 1 is a block diagram illustrating a device that implements graphics rendering in accordance with one or more examples described in this disclosure. FIG. 1 illustrates device 10 that includes graphics processing unit (GPU) 12, system memory 14, and processor 16, which may be a central processing unit (CPU). Examples of device 10 include, but are not limited to, video devices such as media players, set-top boxes, wireless handsets such as mobile telephones, personal digital assistants (PDAs), desktop computers, laptop computers, gaming consoles, video conferencing units, tablet computing devices, and the like. Device 10 may include components in addition to those illustrated in FIG. 1.

System memory 14 may be considered as the memory for device 10. System memory 14 may comprise one or more computer-readable storage media. Examples of system memory 14 include, but are not limited to, a random access memory (RAM), an electrically erasable programmable read-only memory (EEPROM), flash memory, or any other medium that can be used to carry or store desired program code in the form of instructions and/or data structures and that can be accessed by a computer or a processor.

In some aspects, system memory 14 may include instructions that cause processor 16 and/or GPU 12 to perform the functions ascribed to processor 16 and GPU 12 in this disclosure. Accordingly, system memory 14 may be a computer-readable storage medium having instructions stored thereon that, when executed, cause one or more processors (e.g., processor 16 and GPU 12) to perform various functions. For example, as described in more detail, the example rendering techniques described in this disclosure may be implemented by fragment shader 32 of GPU 12. System memory 14 may store the instructions for fragment shader 32 that cause GPU 12 to implement the example techniques described in this disclosure.

System memory 14 may, in some examples, be considered as a non-transitory storage medium. The term "non-transitory" may indicate that the storage medium is not embodied in a carrier wave or a propagated signal. However, the term "non-transitory" should not be interpreted to mean that system memory 14 is non-movable or that its contents are static. As one example, system memory 14 may be removed from device 10, and moved to another device. As another example, memory, substantially similar to system memory 14, may be inserted into device 10. In certain examples, a non-transitory storage medium may store data that can, over time, change (e.g., in RAM).

In some examples, such as examples where device 10 is a wireless handset communication device, processor 16 and GPU 12 may be formed in as an integrated circuit (IC). For example, the IC may be considered as a processing chip within a chip package. In some examples, processor 16 and GPU 12 may be housed in different integrated circuits (i.e., different chip packages) such as examples where device 10 is a desktop or laptop computer. However, it may be possible that processor 16 and GPU 12 are housed in different integrated circuits in examples where device 10 is a wireless handset communication device.

Examples of processor 16 and GPU 12 include, but are not limited to, a digital signal processor (DSP), general purpose microprocessor, application specific integrated circuit (ASIC), field programmable logic array (FPGA), or other equivalent integrated or discrete logic circuitry. In some examples, GPU 12 may be specialized hardware that includes integrated and/or discrete logic circuitry that provides GPU 12 with massive parallel processing capabilities suitable for graphics processing. In some instances, GPU 12 may also include general purpose processing capabilities, and may be referred to as a general purpose GPU (GPGPU) when implementing general purpose processing tasks (i.e., non-graphics related tasks).

Processor 16 may execute various types of applications. Examples of the applications include web browsers, e-mail applications, spreadsheets, video games, or other applications that generate viewable objects for display. Instructions for execution of the one or more applications may be stored within system memory 14. Processor 16 may transmit graphics data of the viewable objects to GPU 12 for further processing.

For instance, processor 16 may offload processing tasks to GPU 12, such as tasks that require massive parallel operations. As one example, graphics processing requires massive parallel operations, and processor 16 may offload such graphics processing tasks to GPU 12. Processor 16 may communicate with GPU 12 in accordance with a particular application processing interface (API). Examples of such APIs include the DirectX® API by Microsoft®, the OpenGL® API by the Khronos group, and the OpenCL™ API; however, aspects of this disclosure are not limited to the DirectX, the OpenGL, or the OpenCL APIs, and may be extended to other types of APIs. Moreover, the techniques described in this disclosure are not required to function in accordance with an API, and processor 16 and GPU 12 may utilize any technique for communication.

To perform graphics operations, GPU 12 may implement a graphics processing pipeline. The graphics processing pipeline includes performing functions as defined by software or firmware executing on GPU 12 and performing functions by fixed-function units that are hardwired to perform very specific functions. The software or firmware executing on the GPU 12 may be referred to as shader programs (or simply shaders), and the shader programs may execute on one or more shader cores of GPU 12. Shader programs provide users with functional flexibility because a user can design the shader program to perform desired tasks in any conceivable manner. The fixed-function units, however, are hardwired for the manner in which the fixed-function units perform tasks. Accordingly, the fixed-function units may not provide much functional flexibility.

For example, processor 16 may execute an application, such as a video game, and processor 16 may generate graphics data as part of the execution. Processor 16 may output the graphics data for processing by GPU 12. GPU 12 may then process the graphics data in the graphics pipeline. In some examples, to process the graphic data, GPU 12 may need to execute one or more shader programs. For example, the application executing on processor 16 may cause processor 16 to instruct GPU 12 to retrieve a shader program from system memory 14 and instruct GPU 12 to execute the shader program.

There are various types of shader programs such as vertex shaders, hull shaders, domain shaders, geometry shaders, and fragment shaders. Each of these example shader programs may form some part of the graphics pipeline. For instance, a fixed-function unit of GPU 12 may output data to the shader core executing one or more of the example shader programs and one or more of the example shader programs may process the data and output the resulting data to another fixed-function unit of GPU 12. It may also be possible for a shader program to receive data from another shader program or output data to another shader program. In this way, the shader programs are implemented as part of a graphics pipeline.

For instance, in the example illustrated in FIG. 1, GPU 12 includes input assembler 18, vertex shader 20, hull shader 22, tessellation stage 24, domain shader 26, geometry shader 28, clipping unit 30, rasterizer 32, fragment shader 34, and post-processor 36. GPU 12 may include more stages than those illustrated, and in some examples, GPU 12 may not necessarily include all of the illustrated stages. Also, the specific ordering of the stages is provided for purposes of illustration and should not be considered limiting.

For example, hull shader 22, tessellation stage 24, and domain shader 26 are configured to implement tessellation. Not all examples of GPUs may be configured to implement tessellation or tessellation may not be needed in various cases. Accordingly, in some examples, GPU 12 may not include hull shader 22, tessellation stage 24, and domain shader 26 or hull shader 22, tessellation stage 24, and domain shader 26 may be bypassed.

In general, it may be possible to bypass any one or more of the stages of the graphics pipeline. As one example, although vertex shader 20 is not illustrated as being coupled to fragment shader 34, in some examples, vertex shader 20 may output data that is retrieved by fragment shader 34. For instance, for a first stage (e.g., either a fixed-function unit or a shader program) of the graphics pipeline to transmit data to a second stage (e.g., another fixed-function unit or another shader program) of the graphics pipeline, the first stage outputs data to a local memory (e.g., cache) of GPU 12 or to system memory 14 if local memory is not available. The second stage then retrieves the data from the local memory of GPU 12 or from system memory 14. Processor 16 or a controller of GPU 12 may manage the transfer of data from one stage to another. In this manner, any stage may be able to pass data to any other stage. However, fixed-function units are generally configured to receive data from a particular stage, whereas shader programs may be designed to receive data from any stage as part of their functional flexibility.

For graphics processing, processor 16 may be configured to define a graphical object or shape as a plurality of polygons that are connected together at their respective vertices. However, this is not the only way in which processor 16 may define a graphics object or shape. In the techniques described in this disclosure, processor 16 may also be configured to define a graphical object or shape as a Boolean expression of a plurality of implicit surfaces. In other words, processor 16 may define some graphical objects or shapes as an interconnection of polygons and define some graphical objects or shapes as a Boolean expression of a plurality of implicit surfaces.

In this disclosure, an implicit surface is a surface that is defined by an equation (referred to as a surface equation) rather than an interconnection of polygons. As an example, a sphere can be defined by the following equation: $Ax^2+By^2+Cz^2$, rather than an interconnection of hundreds or thousands of triangles. For more complex graphical objects, processor 16 may combine different implicit surfaces using Boolean operations. For example, processor 16 may define a graphical object as: implicit surface 1 plus implicit surface 2 minus implicit surface 3. In this example, the resulting object from the rendering of implicit surface 1 plus implicit surface 2 minus implicit surface 3 is an example of a graphical object or shape defined as a Boolean expression of a plurality of implicit surfaces (e.g., the plus and minus operations are Boolean expressions).

In this manner, processor 16 may perform solid modeling to define graphical objects or shapes that GPU 12 is to render. A graphics object or shape that is defined using a Boolean expression of a plurality of implicit surfaces is referred to as a constructive solid geometry (CSG) object or shape.

As described in more detail, the techniques described in this disclosure may utilize a simple and powerful scheme to allow CSG of implicit surfaces on GPU 12. In some examples, fragment shader 32 may be configured to implement these example techniques as described in more detail. However, an overview of the graphics pipeline is provided below to assist with understanding.

Input assembler 18 may read the coordinates, color values, and other such information of vertex points where objects are defined by interconnection of polygons. Input assembler 18 may read the surface equations for the implicit surfaces where objects are defined by a Boolean expression of a plurality of implicit surfaces. In some examples, for CSG objects, processor 12 may define a quad used to define a ray parameter space for rendering the CSB object. A quad may be rectangle and processor 12 may define the vertices of the quad. Input assembler 18 may read the vertices of the quad from system memory 14 and assemble the vertices to form the quad. Input assembler stage 18 may be a fixed-function unit.

Vertex shader 20 may process the vertices (e.g., the polygon vertices or the quad vertices for CSG objects) from input assembler stage 18. Vertex shader 20 is a shader program executing on a shader core of GPU 12. In some examples, vertex shader 20 may perform per-vertex operations such as transformations, skinning, morphing, and per-vertex lighting.

Vertex shader 20 may not need to perform one or more or any of these example functions for CSG objects. Rather, for CSG objects, vertex shader 20 may be configured to transform the quad received from input assembler 18 into a quad that is parallel to a near plane. For instance, for graphics processing, processor 16 may define a view frustum, and the view frustum includes a near plane, a far plane, and two side planes. For CSG objects, vertex shader 20 may determine a quad that is parallel to the near plane of the view frustum using the quad assembled by input assembler 18.

It should be understood that vertex shader 20 may provide branching behavior for CSG objects and objects defined by an interconnection of polygons. For instance, vertex shader 20 is a shader program, and the developer of the shader program may have designed vertex shader 20 such that if the object is defined by an interconnection of polygons, vertex shader 20 executes one set of instructions, and if the object is defined by a Boolean expression of a plurality of implicit surfaces, vertex shader 20 executes another set of instructions. As another example, there may be multiple vertex shaders, and GPU 16 may execute a first vertex shader for objects defined by an interconnection of polygons, and a second, different vertex shader for objects defined by Boolean expressions of a plurality of implicit surfaces.

Hull shader 22, tessellation stage 24, and domain shader 26 may be configured to implement tessellation, and such techniques are not generally needed for CSG objects or shapes. For instance, hull shader 22, tessellation stage 24, and domain shader 26 may be configured to add additional polygons to objects to increase the resolution of the object. However, because implicit surfaces are defined by equations, such tessellation functionality may not be needed and may be bypassed. Hull shader 22 and domain shader 26 are each shader programs, and tessellation stage 24 is a fixed-function unit.

Geometry shader 28 is a shader program, and may further generate additional vertices for the polygons to add even more resolution. Clipping unit 30 and rasterizer 32 may be configured to convert the polygons into pixels for the display. For example, the polygons may be defined as vectors that indicate the interconnection of the polygons, and may be defined in a coordinate space that is independent of the display on which the image is to be displayed. Clipping unit 30 and rasterizer 32 converts these vectors into the display coordinates, and perform any additional functions such as removing points within primitives that are occluded. Clipping unit 30 and rasterizer 32 are fixed-function units.

For CSG objects, geometry shader 28, clipping unit 30, and rasterizer 32 may be bypassed. For instance, implicit surfaces may not be directly rendered using the fixed-function units because the surfaces are defined by equations rather than interconnected vertices. Some techniques attempt to still interconnect polygons on these implicit surfaces (referred to as triangulation for examples where the polygons are triangles) and use the fixed-function units for rendering, such as using clipping unit 30 and rasterizer 32. However, using interconnected polygons may decrease resolution because the surface equation is an ideal representation of the implicit surface, while triangulation is an attempt to approximate the surface.

To overcome the decreased resolution, it may be possible to increase the number of polygons that are connected together to better approximate the surface. However, increasing the number of polygons creates computational complexity because thousands of polygons may be needed to provide the same level of resolution as using the surface equations for rendering.

Although interconnecting polygons may not provide as high a resolution as using implicit surfaces, rendering objects defined by interconnected polygons tends to exploit the massive parallel processing capabilities of GPU 12 better than rendering CSG objects. For example, rasterizer 32 may be able to determine the display coordinates for the vertices faster than techniques for rendering implicit surfaces. For instance, GPU 12 utilizes ray-tracing to achieve visually rich renderings of CSG objects or shapes. However, some ray-tracing techniques tend to be slower than rasterization.

The techniques described in this disclosure provide for ray-tracing techniques for rendering CSG objects or shapes which result in faster rendering as compared to some other ray-tracing techniques for rendering CSG objects. For instance, as described in more detail below, the techniques described in this disclosure decompose the Boolean expression of the plurality of implicit surfaces into a sum-of-products form and render each product term. In other words, the techniques described in this disclosure evaluate each surface equation of the plurality of implicit surfaces that are combined together using Boolean expression to form the CSG object or shape.

As described below, fragment shader 34 may be configured to implement the techniques described in this disclosure. However, the techniques described in this disclosure should not be considered limited to fragment shader 34 performing the example techniques. Other shaders in addition to or instead of fragment shader 34 may be configured to implement the techniques described in this disclosure.

In general, for non-CSG objects or shapes, fragment shader 34 receives the pixels as outputted by rasterizer 32. Fragment shader 34 may perform post processing to assign color values to each of the pixels that are to be displayed. For example, fragment shader 34 may receive constant values stored in system memory 14, texture data stored in system memory 14, and any other data to generate per-pixel outputs such as color values. Fragment shader 34 may also output opacity values that indicate the opaqueness of the pixels.

In the techniques described in this disclosure, fragment shader 34 may perform functions such as compute per-pixel color and depth. However, fragment shader 34 may not rely on the values generated by rasterizer 32. Rather, fragment shader 34 may include instructions to implement ray-tracing techniques to determine which pixels are to be rendered. For example, the developer may develop fragment shader 34 such that if fragment shader 34 is processing CSG objects, fragment shader 34 is configured to implement ray-tracing techniques in addition to the other example functions described above. As another example, there may be multiple fragment shaders, and GPU 20 may execute a first fragment shader for objects defined by the interconnection of polygons, and execute a second, different fragment shader for objects defined by implicit surfaces.

In ray-tracing techniques, fragment shader 34, acting on a pixel of screen, has an input ray from a known origin point (O) at a certain direction (d). Fragment shader 34 determines the intersection of the ray with the implicit surface, and uses the intersection point to determine (e.g., identify) a pixel on the object. As described in more detail, this disclosure describes techniques for fast determination of the intersection point of a ray and an implicit surface (i.e., the point where the ray hits the implicit surface). For instance, with the techniques described in this disclosure, fragment shader 34 may be configured to quickly determine whether a ray associated with a pixel intersects the CSG object. If the ray associated with a pixel intersects the CSG object, this disclosure further describes a way for fragment shader 34 to determine the intersection point of the CSG object and per-pixel color and depth analysis of the pixel. If the ray associated with a pixel does not intersect the CSG object, fragment shader 34 may discard that pixel from further processing.

To determine the intersection point, fragment shader 34 may convert the surface equations of the implicit surfaces into surface equations in ray-coordinates. For example, processor 16 defines the surface equations of the implicit surfaces in Cartesian-coordinates (i.e., x, y, and z). For instance, the equation for a sphere is $x^2+y^2+z^2$. Also, fragment shader 34 may define the origin point (O) for the ray in Cartesian-coordinates (i.e., (Ox, Oy, Oz)), and define the direction in Cartesian-coordinates (i.e., (dx, dy, dz)). The equation, referred to as a parametric ray equation, used to convert the surface equations to ray-coordinates is O+td, where "t" is an unknown ray parameter. The values of Ox, Oy, and Oz and dx, dy, and dz may be known to fragment shader 34 because fragment shader 34 defines these values for the ray.

To convert the surface equations in Cartesian coordinates to ray coordinates, fragment shader 34 substitutes (Ox+tdx) for the x-coordinates of the surface equations, (Oy+tdy) for the y-coordinates of the surface equations, and (Oz+tdz) for the z-coordinates of the surface equations. For instance, the surface equation of the sphere can be re-written as the following surface equation: $(Ox+tdx)^2+(Oy+tdy)^2+(Oz+tdz)^2$. Because the values of Ox, Oy, Oz, dx, dy, and dz are known, the only unknown value is that of "t."

In accordance with the techniques described in this disclosure, once fragment shader 34 converts the equations of the implicit surfaces defined in Cartesian coordinates to equations of the implicit surfaces defined in ray parameters, fragment shader 34 may determine the presence of the roots of the equations of the implicit surfaces (i.e., determine whether the roots of the equations of the implicit surfaces are real values or imaginary values). The roots of the equations of the implicit surfaces refer to the value of the unknown variable "t" when the equations of the implicit surfaces are set equal to zero.

In other words, a surface equation for an implicit surface (S) can be represented as S(x, y, z) (i.e., implicit surface S is a function of variables x, y, and z). The roots of the surface equation may be found from setting S(x, y, z) equal to zero (i.e., S(x, y, z)=0). In the techniques described in this disclosure, fragment shader 34 may substitute the parametric ray equation, (O+td), into the implicit surface equation to determine an implicit surface equation that is only a function of the variable t, since the values of O and d are set by fragment shader 34. For instance, the surface equation for the implicit surface as a function oft may be represented as f(t). Fragment shader 34 may determine the presence of the roots for f(t) (i.e., determine whether the possible values oft are real or imaginary when f(t)=0).

In many cases, there may be multiple possible values for t when f(t) equals 0. As a basic example, if f(t) is a quadratic equation (i.e., a polynomial of 2), then are up to two root values. For instance, the equation $At^e+Bt+C=0$ has up to two values for t. The two values oft (i.e., the two root values) are: $t=(-B\pm sqrt(B^2-4AC))/2A$.

The root values for the surface equation of the implicit surface (i.e., the root values for f(t)) may be a plurality of real-root values, a plurality of imaginary-root values, or a single real-root value. For instance, keeping with the above example of a quadratic equation, if $B^2-4AC$ is greater than zero, then there are two possible real-root values for f(t). If $B^2-4AC$ is less than zero, then there are two possible imaginary-root values for f(t). If $B^2-4AC$ equals zero, then there is one real-root value for f(t). The same applies for surface equations for implicit surfaces with higher-order polynomials (i.e., polynomials greater than two) but with more real-root or imaginary-root values.

In this sense, a root value of a surface equation is a value that when substituted into the surface equation causes the result of the surface equation to equal zero. For instance, if the root value is substituted for "t" in f(t), the result of f(t) would be equal to zero. A real-root value is a value that includes no imaginary components (i.e., not an imaginary value). Also, some root values may be complex numbers that include a real component and an imaginary component. A real-root value is not a complex number because the complex number includes an imaginary component.

Fragment shader 34 may determine the presence of real-root values for each of surface equations of the implicit surfaces. If the surface equation for an implicit surface has real-root values, then fragment shader 34 may determine that the ray intersects the implicit surface. If the surface equation for an implicit surface has no real-root values, then fragment shader 34 may determine that the ray does not intersect the implicit surface. The techniques described in this disclosure exploit this finding that the existence of real-root values, via an analysis of the present of real-roots, can be used to determine whether the ray intersects a particular implicit surface, and further to determine the intersection point used for rendering purposes. For instance, the techniques described in this disclosure may determine an intersection point of a ray with a graphical object or shape (e.g., a CSG object or shape) based on a determination of which surface equations have real-root values.

Accordingly, in some examples, fragment shader 34 may be configured to determine that the ray intersects an implicit surface only if the surface equation of the implicit surface has at least one positive real-root value. For instance, if the surface equation for the implicit surface has one positive real-root value and one or more complex values, then the ray intersects the implicit surface. If the surface equation for the implicit surface has only imaginary-root values, only complex values, or imaginary-root values and complex values and no positive real-root values (i.e., no positive real-root values), then the ray does not intersect the implicit surface. In general, positive real-root values are for points in the front of the camera (e.g., for viewable points).

The techniques described in this disclosure utilize the presence of the real-roots to determine the intersection point of the ray (i.e., the point where the ray intersects an implicit surface). For instance, fragment shader 34 may classify each of the implicit surfaces as an uncomplemented surface or a complemented surface. As described above, an uncompleted surface is an implicit surface from which other surfaces are subtracted, and a complemented surface is an implicit surface that is subtracted from other surfaces (i.e., a CSG object is formed from complemented surfaces subtracted from uncomplemented surfaces).

As an example, assume that processor 16 defined a CSG object as: surface 1 plus surface 2 minus surface 3. In this example, surface 1 and surface 2 are uncomplemented surfaces and surface 3 is a complemented surface. More specifically, in this example, the CSG object is a Boolean expression (due to the pluses and minuses) that processor 16 defined in sum-of-products form (i.e., a sum or subtraction of surfaces that together form the CSG object).

In accordance with the techniques described in this disclosure, fragment shader 34 may determine whether the surface equations for each of the uncomplemented surfaces have at least one real-root value (e.g., at least one positive real-root value) and determine whether the surface equations for each of the complemented surfaces have no real-root values (e.g., no positive real-root values). If such a condition is satisfied, then fragment shader 34 may utilize the actual real-root values to determine the intersection point of the ray for per-pixel color and depth analysis as described in more detail. If such a condition is not satisfied, then fragment shader 34 may determine that the ray does not intersect the CSG object and discards the pixel associated with the ray (i.e., the pixel is no longer needed for processing).

Stated another way, the surface equations for the uncomplemented surfaces may be referred to as uncomplemented terms, and the surface equations for the complemented surfaces may be referred to as complemented terms. Also, each of the implicit surfaces may be associated with a membership intersection flag (i.e., a binary value that indicates whether a surface is intersected or not). In this example, if all the uncomplemented terms are intersected and all complemented terms are not (i.e., all membership intersection flags should be true for uncomplemented terms and false for complemented terms), then fragment shader 34 may determine the intersection point of the CSG object from the real-root values of the uncomplemented surfaces. For instance, one of the real-root values for each of the uncomplemented surfaces may indicate the intersection point of the ray to that uncomplemented surface. Fragment shader 34 may determine the intersection point of the CSG object from the intersection points of the uncomplemented surface.

In this sense, fragment shader 34 may utilize the following to represent an implicit surface: a surface equation in Cartesian coordinates (e.g., S(x, y, z)), a surface equation by substituting ray parameters inside surface equation, a univariate equation (e.g., f(t) converted from S(x, y, z)), a flag whether the ray intersects the implicit surface (i.e., a membership intersection flag), a flag whether the implicit surface is an uncomplemented surface or a complemented surface, and a point of intersection with the ray for the uncomplemented surface. In some examples, the surface equation (e.g., S(x, y, z) and the normal equation (e.g., f(t)) may be functions. Fragment shader 34 may store the intersection points as a floating point array and the membership intersection flags as Boolean array. Based on these values, fragment shader 34 may be able to determine the intersection point of a ray to the CSG object or shape. GPU 12 may then use this intersection point for per-pixel color and depth processing.

As described above, if the surface equations for each of the uncomplemented surfaces have at least one real-root value and the surface equations for each of the complemented surfaces have no real-root values, fragment shader 34 may determine that the ray associated with a particular pixel intersects the CSG object. In the techniques described in this disclosure, to determine the intersection point of the ray with the CSG object, fragment shader 34 may determine the maximum from among a set of real-root values of the surface equations. The maximum value from among the set of real-root values indicates the point of intersection. The point of intersection of a ray may indicate the location of the pixel associated with the ray on the CSG object.

In some examples, fragment shader 34 may determine a set of real-root values from among all of the real-root values of the surface equations. The set of real-root values may include one real-root value for each of the surface equations. This real-root value that belongs to the set of real-root values may be the minimum of the real-root values of the real-root values of a surface equation of an uncomplemented surface.

For example, similar to above, assume that processor 16 defines a CSG object as surface 1 plus surface 2 minus surface 3, where surface 1, surface 2, and surface 3 are all quadratic (i.e., polynomial equal to 2) equations. Also, assume that the root values for surface 1 and surface 2 are real and the root values for surface 3 are imaginary. This means that the ray intersects the uncomplemented surfaces (e.g., surface 1 and surface 2) and does not intersect the complemented surface (e.g., surface 3).

In this example, there are two real-root values for the surface equation for surface 1 (referred to as real-root A and real-root B) and two real-root values for the surface equation for surface 2 (referred to as real-root C and real-root D). Fragment shader 34 may determine the minimum between real-root A and real-root B (assume that is real-root A) and determine the minimum between real-root C and real-root D (assume that is real-root D). In this example, real-root A and real-root D form a set of real-root values from all of the real-root values of the surface equations for surface 1 and surface 2. Fragment shader 34 may then determine the maximum between real-root A and real-root D (assume that is real-root A). In this example, the value of real-root A may indicate the point of intersection of the ray associated with a particular pixel.

Determining a minimum real-root value from the real-root values of each surface equation to determine a set of real-root values from among all real-root values may not be necessary in every example. In some examples, fragment shader 34 may determine the maximum real-root value from the real-root values of the surface equations. In other words, in some examples, a set of real-root values may include all real-root values of the surface equations.

Moreover, in the examples described above, fragment shader 36 may determine whether the roots are real or not for the surface equations of the implicit surfaces. In some examples, fragment shader 36 may additionally determine whether the real-root values are within a view frustum, and determine that the real-root values indicate an intersection point only if the real-root values are within the view frustum. For example, as described above, processor 16 may define a view frustum of a camera, and the view frustum includes a near plane, a far plane, and two side planes. The near plane may be indicated as $t_{near}$ and the far plane may be indicated as $t_{far}$. In some examples, fragment shader 34 may determine whether the intersection point of an uncomplemented surface (i.e., a real-root value) is within the near plane and far plane (i.e., within $[t_{near}, t_{far}]$). In some non-limiting examples, fragment shader 34 may only utilize the real-root values for the surface equations of the uncomplemented surfaces that fall within near plane and far plane for determining the intersection point of the ray with the CSG object.

After fragment shader 34 determines the intersection point of a ray with the CSG object (i.e., the location of the pixel associated with the ray on the CSG object), fragment shader 34 may output the intersection point to post-processor 36, which is a fixed-function unit. Post-processor 36 may perform any final pixel processing. For example, post-processor 36 may utilize depth information to further determine whether any of the pixels should be removed from being displayed (referred to as a depth test). Post-processor 36 may also perform blending operations to generate final pixel values.

Post-processor 36 may output the final pixel values to a frame buffer, generally located within system memory 14, but which may be located within GPU 12. A display processor (not shown) may retrieve the pixel values from the frame buffer and cause pixels of a display (not shown) of device 10 to illuminate accordingly to the pixel values to cause the display to display the image.

As described above, to determine the intersection point, fragment shader 34 may determine the presence of roots. There may be various ways in which fragment shader 34 determines the presence of roots and the techniques described in this disclosure may be applicable to any such technique. For purposes of illustration, the following describes two example techniques for determining the presence of roots: (1) discriminant analysis and (2) root isolation adaptive marching points technique.

The discriminant analysis may function well for surface equations with polynomials equal to four or less (i.e., quartic or less). In some examples, for surface equations with polynomials equal to four or less, fragment shader 34 may be able to determine the root values exactly. Hence, for surface equations with polynomials equal to four or less, fragment shader 34 may be considered as rendering exact CSG objects of implicit surfaces. For surface equations with polynomials greater than four, determining the presence of real-roots using discriminant analysis and determining the actual root values may be extremely complex for fragment shader 34 to handle. Accordingly, for surface equations with polynomials greater than four, fragment shader 34 may implement the adaptive marching points technique to determine the presence or real-root values and approximate the real-root values. Hence, for surface equations with polynomials greater than four, fragment shader 34 may be considered as rendering approximate CSG objects of implicit surfaces.

It should be understood that conceptually, it may be possible for fragment shader 34 to implement the adaptive marching points technique for surface equations with polynomials less than or equal to four, or possible for fragment shader 34 to implement discriminant analysis for some surface equations with polynomials greater than four (i.e., may be up to polynomial of six). However, because discriminant analysis provides for more exact root values as compared to the adaptive marching points technique without a processing time penalty, fragment shader 34 may utilize discriminant analysis for surface equations with polynomials equal to or less than four. In some examples, discriminant analysis, especially for surface equations with polynomials less than or equal to four, may be much faster than the adaptive marching points technique.

A discriminant is a function of the coefficients of a surface equation and provides information about the roots of the surface equation. For example, a quadratic equation (i.e., polynomial of two) is $ax^2+bx+c$, and the discriminant for the quadratic equation is $b^2-4ac$. If $b^2-4ac$ is greater than zero, then there are two real-roots, if equal to zero, then there is one real-root, and if less than zero, then there are two imaginary-roots. Also, the root values can be determined from the well-known equation: $(-b\pm\text{sqrt}(b^2-4ac))/2a$.

A cubic equation (i.e., polynomial of three) is $ax^3+bx^2+cx+d$, and the discriminant of the cubic equation is $b^2c^2-4ac^3-4b^3d-27a^2d^2+18abcd$. If $b^2c^2-4ac^3-4b^3d-27a^2d^2+18abcd$ is greater than zero, then there are three real-roots, if equal to zero, then one real-root, and if less than zero, then one real-root and two complex values that are complex conjugates of one another.

While the discriminant analysis may not function well for surface equations with polynomials greater than four (e.g., take too long to perform discriminant analysis for surface equations with polynomials greater than four), the root isolation adaptive marching points techniques may provide a suitable approximation of the root values. In this technique, fragment shader 34 may divide the view frustum from the near plane to the far plane in segments (e.g., 1% step-size, 5% step-size, or 10% step-size as a few examples, although other sizes are possible). As an example, assume the near plane ($t_{near}$) is located at a value of one and the far plane ($t_{far}$) is located at value of a two, and fragment shader 34 divided the distance between the planes in step-sizes of tenths (e.g., 1.0, 1.1, 1.2, 1.3 . . . 2.0).

Fragment shader 34 may substitute each of the segment value into the surface equation and determine the segment values where the sign of the resulting value changed. For example, keeping with the previous example, fragment shader 34 may first substitute the value of 1.0 into the surface equation and determine the sign of the resulting value (assume positive). Fragment shader 34 may then substitute the value of 1.1 into the surface equation and determine the sign of the resulting value (assume still positive). Fragment shader 34 may repeat this step until fragment shader 34 substitutes a value into the surface equation for where the sign changed.

For instance, assume that with the value of 1.4, the resulting value was positive, but with the value of 1.5, the resulting value was negative. In this example, fragment shader 34 may determine that the real-root value for the surface equation is between 1.4 and 1.5. This is because the root value indicates the value of the unknown "t" variable when the equation equals zero. If the sign changed from one segment to the next (one step to the next), it means that the value of "t" that causes the surface equation to equal zero is somewhere in the middle of the segment.

In the previous example, fragment shader 34 determined when the sign changed from positive to negative to determine the segment within which the real-root value exists. In some examples, the sign may change from negative to positive, and such a sign change may also be indicative that the root value is within the segment. Furthermore, fragment shader 34 may begin from the near plane and extend out to the far plane, rather than from the far plane to the near plane. The reason for this is that the first time the sign changes starting from the near plane is indicative of the intersection point of the ray with the implicit surface. If fragment shader 34 started from the far plane towards the near plane, then the first sign change would be indicative of the ray exiting the implicit surface (i.e., the backside of the implicit surface). Since the front-side of the implicit surface is what is viewable, fragment shader 34 may being from the near plane and extend out to the far plane to identify the segment where the sign first changes for the result of the surface equation.

In some cases, fragment shader 34 may substitute all of the segment values into the surface equation for the implicit surface (i.e., all segments from the near plane to the far plane), and the sign of the resulting value may never change. Such cases indicate that there are no real-roots for the surface equation of the implicit surface, or at least no positive real-roots within the edges of the near and far planes of the view frustum. Accordingly, in such cases, the ray does not intersect the implicit surface.

Once fragment shader 34 determines a segment within which the root value exists, fragment shader 34 may utilize Newton's bisection technique to hone in on the root value (i.e., root refinement). The bisection technique, also referred to as a binary search algorithm, substitutes the half point of the segment into the surface equation and determines whether the result is closer to the lower half of the segment or the upper half of the segment. Then the bisection technique substitutes of the half point of the half-segment and recursively substitutes smaller and smaller values until the resulting value is approximately zero.

For instance, in the above example, fragment shader 34 first determined that the real-root value is between 1.4 and 1.5 by substituting values for "t" of the surface equation in given segment sizes. Fragment shader 34 may then substitute the value of 1.45 (half of 1.4 and 1.5) into the surface equation, and determine the sign of the resulting value. If the sign of the resulting value is positive, then fragment shader 34 may substitute the value of 1.425 (half of 1.4 and 1.45) into the surface equation. If the sign of the resulting value is negative, then fragment shader 34 may substitute the value of 1.475 (half of 1.45 and 1.5) into the surface equation. Fragment shader 34 may keep halving and repeating these steps. As fragment shader 34 repeats these steps, after a few iterations, the value of the surface equation will converge to approximately zero. Fragment shader 34 may determine the value of "t" for which the value of the surface equation converged approximately to zero.

For instance, as an illustration, assume that for a value of 1.40625 for the variable "t" in the surface equation, the resulting value was 0.0003. In this example, fragment shader 34 may determine that a value of 0.0003 is substantially close to zero, and approximate the real-root value for the surface equation as 1.40625. Fragment shader 34 may then utilize this real-root value for determining the intersection point based on the maximum from among a set of the real-root values for the uncomplemented surfaces.

In this manner, the disclosure describes a device 10 for rendering graphical objects or shapes. As illustrated device 10 includes system memory 14. In some examples, system memory 14 stores a plurality of surface equations for respective ones of a plurality of implicit surfaces. In the techniques described in this disclosure, the plurality of implicit surfaces together form a graphical object or shape (e.g., a CSG object or shape). In some examples, a memory that stores a plurality of surface equations for respective ones of a plurality of implicit surfaces may be local memory of GPU 12. For example, processor 16 may output the surface equations for the implicit surfaces in form of a Boolean expression. In some examples, GPU 12 may receive the surface equations for the implicit surfaces in form of the Boolean expression from system memory 14. In some examples, GPU 12 may receive the surface equations for the implicit surfaces in form of the Boolean expression from local memory of GPU 12.

As illustrated, device 10 includes GPU 12, and GPU 12 may be configured to determine which surface equations have real-root values (e.g., positive real-root values). As described above, a real-root value for each of the respective surface equations is a value that includes no imaginary component that when substituted into the respective surface equations causes the result of the respective surface equations to equal zero. GPU 12 may also be configured to determine an intersection point of a ray with the graphical object or shape based on the determination of which surface equations have real-root values. For example, fragment shader 34 executing on GPU 12 may cause GPU 12 to determine which surface equations have real-root values (e.g., positive real-root values) and determine the intersection point of the ray with the graphical object or shape based on the determination of which surface equations have real-root values.

GPU 12 may also be configured to render a pixel of the graphical object or shape based on the determined intersection point. For instance, fragment shader 34 may function on a per-pixel level and determine the resulting intersection point of the correct implicit surface. GPU 12 may suitably light the intersection point as part of the rendering process.

As described above, GPU 12 may determine a near plane ($t_{near}$) and a far plane ($t_{far}$) of a view frustum. In some examples, GPU 12 may determine which surface equations of the plurality of surface equations for respective ones of the plurality of implicit surfaces have positive real-root values between the near plane and the far plane.

The techniques described in this disclosure may provide one or more advantages. For instance, as described above, some other ray-tracing techniques for CSG failed to recognize that the presence of real-root values can be utilized determine an intersection point of a ray with a graphical object or shape. These other techniques, rather than using real-root values analysis, instead determined an intersection point for each of the implicit surfaces, resulting in a plurality of possible intersection points. These other techniques utilized a sorting algorithm on the plurality of possible intersection points to determine an intersection point of a ray with the graphical object or shape.

In the techniques described in this disclosure, only the presence of positive real-root values are needed to determine whether there is intersection, and a maximum of the positive real-root values is indicative of the intersection point. The techniques do not require any explicit sorting of intersection points or any iteration through the intersection points in increasing order of parameter value.

Such sorting algorithms are generally complex and require many iterations, which increases the rendering time. As described above, GPU 12 may determine a set real-root values and determine a maximum from the set of real-root values to determine the intersection point of the ray. In this manner, GPU 12 may determine the intersection point of the ray faster and with less complexity than techniques that rely on the sorting algorithms or iterations through intersection points in increasing order of parameter value.

For instance, the techniques described in this disclosure are linear in number of operations needed. However, the other techniques that require sorting may require more operations. The technique described in this disclosure may provide for real-time rates for 4-5 terms in the Boolean expression for the techniques that approximate the real-root values and faster than real-time rates for the techniques the determine the real-root values exactly (e.g., based on discriminant analysis). For instance, there may be a frame-rate (i.e., frames per second or FPS) associated with the graphics generated by the application executing on processor 16. If GPU 12 is able to render the CSG object or shape at the frame-rate or at a frame-rate for which there is little to no negative impact on the user, then the techniques may be considered as rendering for real-time rates. If GPU 12 is able to render the CSG objects faster than the associated frame-rate, then the techniques may be considered as rendering faster than real-time rates.

Figure 2:
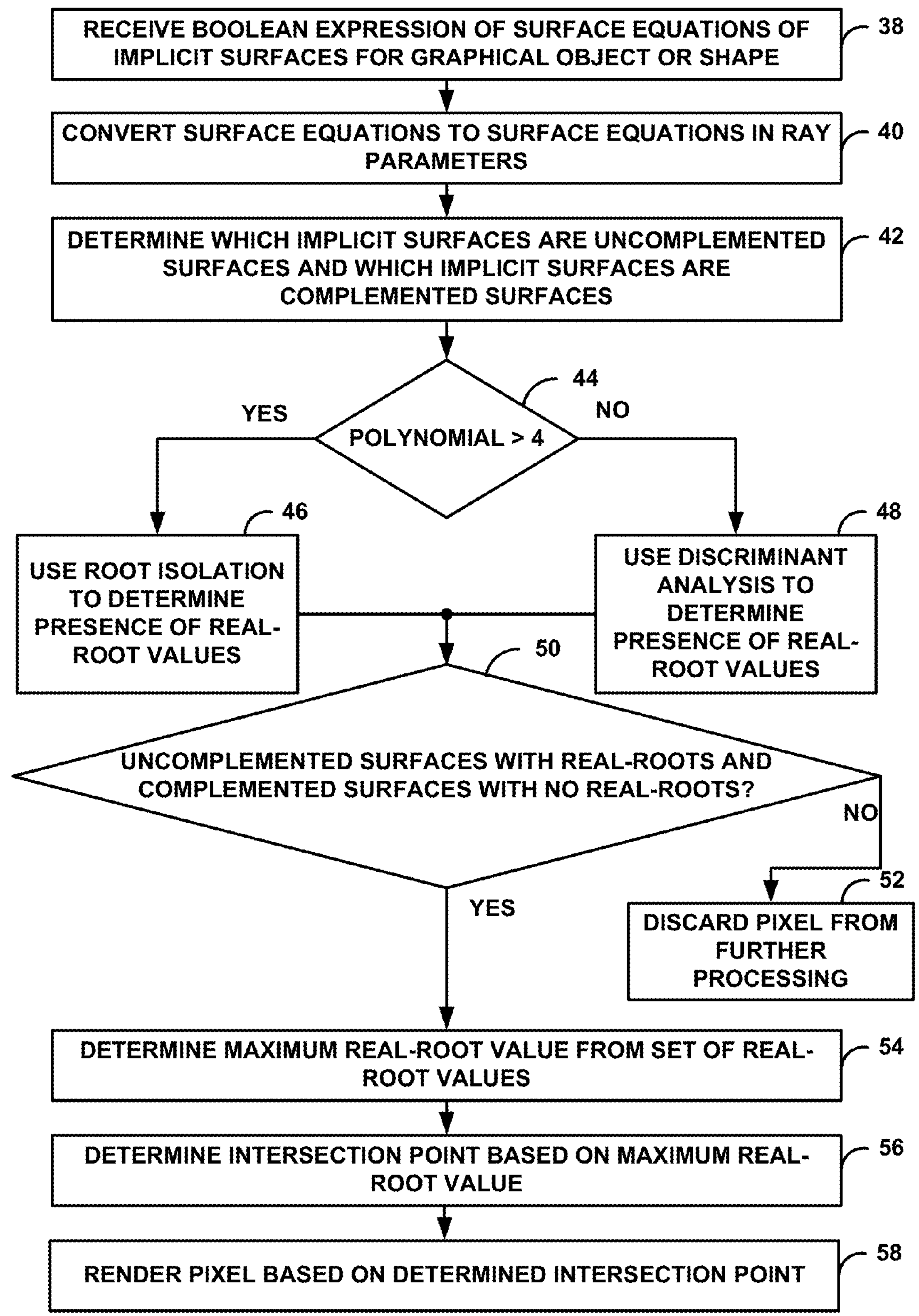
FIG. 2 is a flowchart illustrating an example method in accordance with this disclosure.

FIG. 2 is a flowchart illustrating an example method in accordance with this disclosure. For example, GPU 12 may receive a Boolean expression of surface equations of implicit surfaces for graphical object or shape (38). As one example, the Boolean expression of surface equations may include additions and subtractions of surface equations for implicit surfaces that together form a CSG object or shape. GPU 12 may receive such a Boolean expression of the surface equations from a memory such as system memory 14 or from a local memory of GPU 12. Each of the surface equations may be defined in Cartesian coordinates and may be represented as S(x, y, z).

GPU 12, via fragment shader 34, may convert the surface equations to surface equations in ray parameters (40). For example, the ray parameters include a known origin (O) and a known direction (d), and an unknown variable t. GPU 12 may substitute Ox+tdx for all x-variables in the surface equations, substitute Oy+tdy for all y-variables in the surface equations, and substitute Oz+tdz for all z-variables in the surface equations to convert the surface equations to surface equations in ray parameters. Because the values of O and d are known, the resulting surface equation may only be a function of variable "t." Accordingly, the surface equation S(x,y,z) may be represented as f(t) after conversion.

GPU 12, via fragment shader 34, may determine which implicit surfaces are uncomplemented surfaces and which implicit surfaces are complemented surfaces (42). As described above, an uncomplemented surface is an implicit surface from which another implicit surface is subtracted as indicated in the Boolean expression, and a complemented surface is an implicit surface that is subtracted from another implicit surface as also indicated in the Boolean expression. GPU 12 may therefore use the Boolean expression to determine which implicit surfaces are uncomplemented surfaces and which implicit surfaces are complemented surfaces.

For each implicit surface (i.e., whether uncomplemented or complemented), GPU 12 may determine whether the surface equation has a polynomial greater than four (44). If the polynomial of the surface equation is greater than four (YES of 44), GPU 12 may determine the presence of real-roots for the surface equations using the root isolation adaptive marching points technique (46). If the polynomial of the surface equation is less than or equal to four (NO of 44), GPU 12 may determine the presence of real-roots for the surface equations using discriminant analysis (48). In some examples, GPU 12 may determine the presence of real-roots for the surface equations only between a near plane and a far plane of a view frustum.

GPU 12 may determine whether the surface equations for the uncomplemented surfaces have real-roots and whether surface equations for the complemented surfaces do not have real-root values (50). If the surface equations for at least one of the uncomplemented surfaces do not have real-root values or if the surface equations for at least one of the complemented surfaces has a real-root value (NO of 50), GPU 12 may determine that the ray does not intersect the graphical object or shape, and may discard the pixel associated with the ray from further processing (52).

If the surface equations for the uncomplemented surfaces have real-root values and the surface equations for the complemented surfaces do not have real-root values (YES of 50), GPU 12 may determine a maximum real-root value from among a set of real-root values for the surface equations for the uncomplemented surfaces (54). For example, GPU 12 may determine the real-root values only for the surface equations of the uncomplemented surfaces. GPU 12 may not need to determine the root values for the complemented surfaces.

From among the real-root values determined only for the surface equations of the uncomplemented surfaces, GPU 12 may determine a set of real-root values. This set of real-root values may include one real-root value for each of the surface equations for respective uncomplemented surfaces. For instance, there may be multiple real-root values for each surface equation of the uncomplemented surfaces. GPU 12 may determine the minimum real-root value for a given surface equation of an uncomplemented surface, and may repeat this step for each surface equation of the uncomplemented surfaces. The resulting set of minimum real-root values forms the set of real-root values among from which GPU 12 determines the maximum real-root value. In some alternative examples, the set of real-root values may include all of the real-root values of the surface equations for the uncomplemented surfaces.

GPU 12 may determine an intersection point based on the maximum real-root value (56). In this manner, GPU 12 may determine the intersection point of a ray associated with a pixel with the graphical object or shape based on the determination of which surface equations have real-root values. For instance, for each pixel of a display, there may be an associated ray, and in this manner, GPU 12 may determine that the intersection point of the ray associated with the pixel is equal to the maximum real-root value. GPU 12 may render the pixel based on the determined intersection point (58). For example, GPU 12 may perform per-pixel color and depth processing on the pixel to render the pixel as part of rendering the graphical object or shape. For instance, by repeating these steps for all pixels, GPU 12 may render the graphical object or shape.

FIGS. 3A-H are example illustrations of graphical objects rendered in accordance with techniques described in this disclosure. The examples illustrated in FIGS. 3A-3H are generated at a resolution of 512×512. Also, the examples illustrated in FIGS. 3A-3H are rendered from a combination of different types of surfaces including a Chmutov Sextic, Goursat, Sphere Complement, Sphere, Cone, Barth Decic, and Clebsch.

The Barth Decic is a surface of degree 10 and its surface equation is: $8(x^2-{}^4y^2)(y^2-{}^4z^2)(z^2-{}^4x^2)(x^4+y^4-2x^2y^2-2x^2z^2-2y^2z^2)+(3+5)(x^2+y^2+z^2-1)^2(x^2+y^2+z^2-2+)^2=0$, where =(1+sqrt(5))/2 is the golden ratio. The Chumtov Sextic is $T_6(x)+T_6(y)+T_6(z)=0$, where $T_6(x)$ equals $2x^2(3-4x^2)^2-1=36x^6-48x^4+18x^2-1$ is the Chebyshev polynomial of the first kind of degree 6. The Goursat is $x^4+y^4+z^4-1=0$. The Clebsh is $81(x^3+y^3+z^3)-189(x^2(y+z)+y^2(x+z)+z^2(x+y))+54xyz+126(xy+yz+xz)-9(x^2+y^2+z^2)-9(x+y+z)+1=0$. The equation for sphere, and cone are well-known in the art.

Figure 3A:
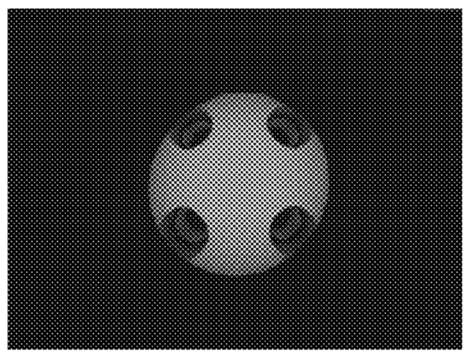
FIGS. 3A-H are example illustrations of graphical objects rendered in accordance with techniques described in this disclosure.
Figure 3B:
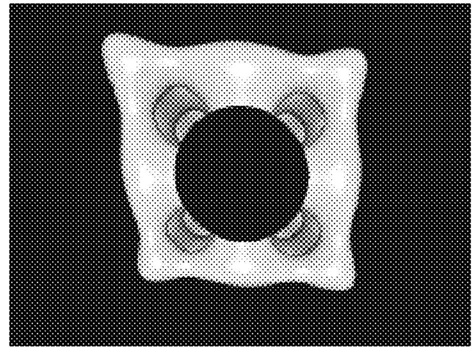
Figure 3C:
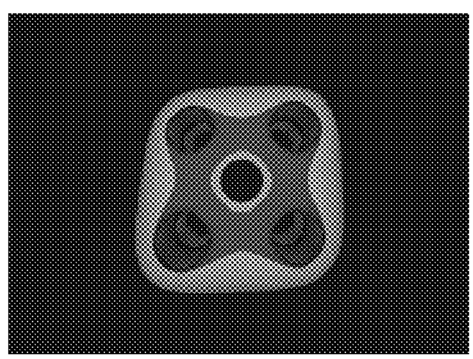
Figure 3D:
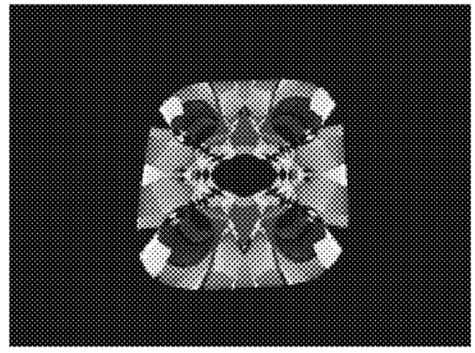

FIG. 3A illustrates the intersection of Chmutov Sextic and Sphere, with a frames per second (FPS) of 22. FIG. 3B illustrates the intersection of Chmutov Sextic and Sphere with FPS of 21. FIG. 3C illustrates the intersection of Chmutov Sextic, Goursat, and Sphere Complement with FPS of 14. FIG. 3D illustrates the intersection of Chmutov Sextic, Goursat, Barth Decic, and Sphere Complement with FPS of 11. In all of FIGS. 3A to 3D, the real-root value is approximated using techniques described above.

Figure 3E:
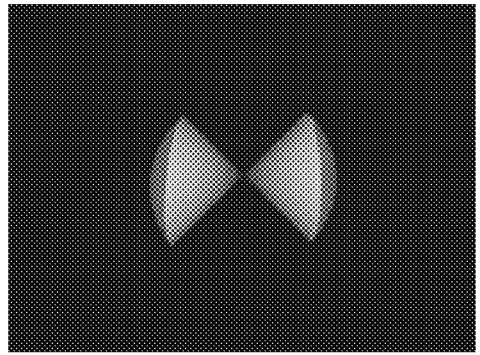
Figure 3F:
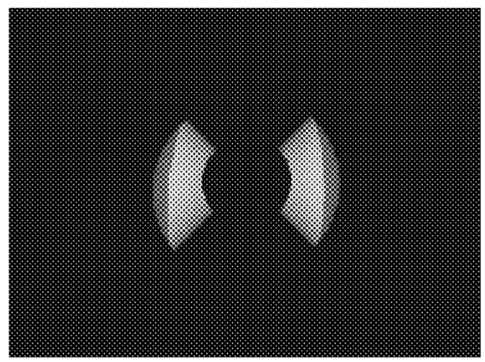
Figure 3G:
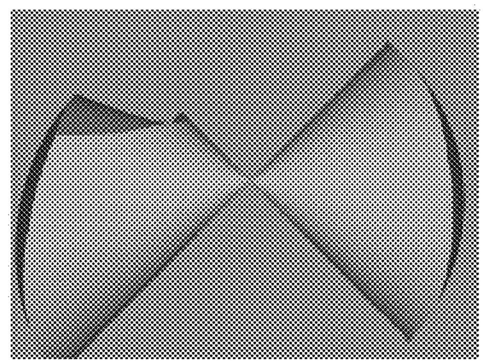
Figure 3H:
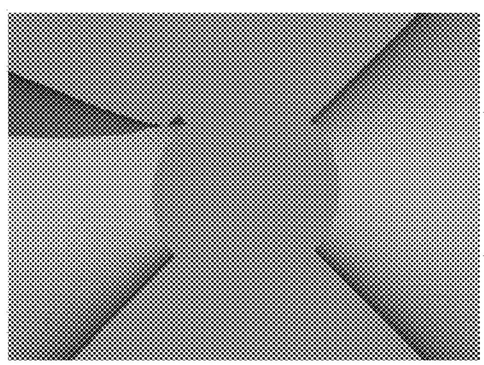

FIG. 3E illustrates the intersection of Cone and Sphere with FPS of 924. FIG. 3F illustrates intersection of Cone, Sphere Complement, and Sphere with FPS of 944. FIG. 3G illustrates intersection of Cone, Clebsh, and Sphere with FPS of 506. FIG. 3H illustrates intersection of Cone, Clebsh, and Sphere Complement with FPS of 500. In all of FIGS. 3E-3H, the real-root value is found exactly using the discriminant techniques described above.

For the objects rendered in FIGS. 3A-3D, it would require 10 k to 30 k terms if triangulation is used. For the objects rendered in FIGS. 3E-3H, it would require 5 k to 10 k terms if triangulation is used. With the techniques described in this disclosure, the rendering takes linear time with low computational requirements that produce visually rich and fast rendering of graphical objects such as for graphics on mobile devices (e.g., wireless communication device). In some cases, Blist expression form may be used for complex three-dimensional objects.

Figure 4:
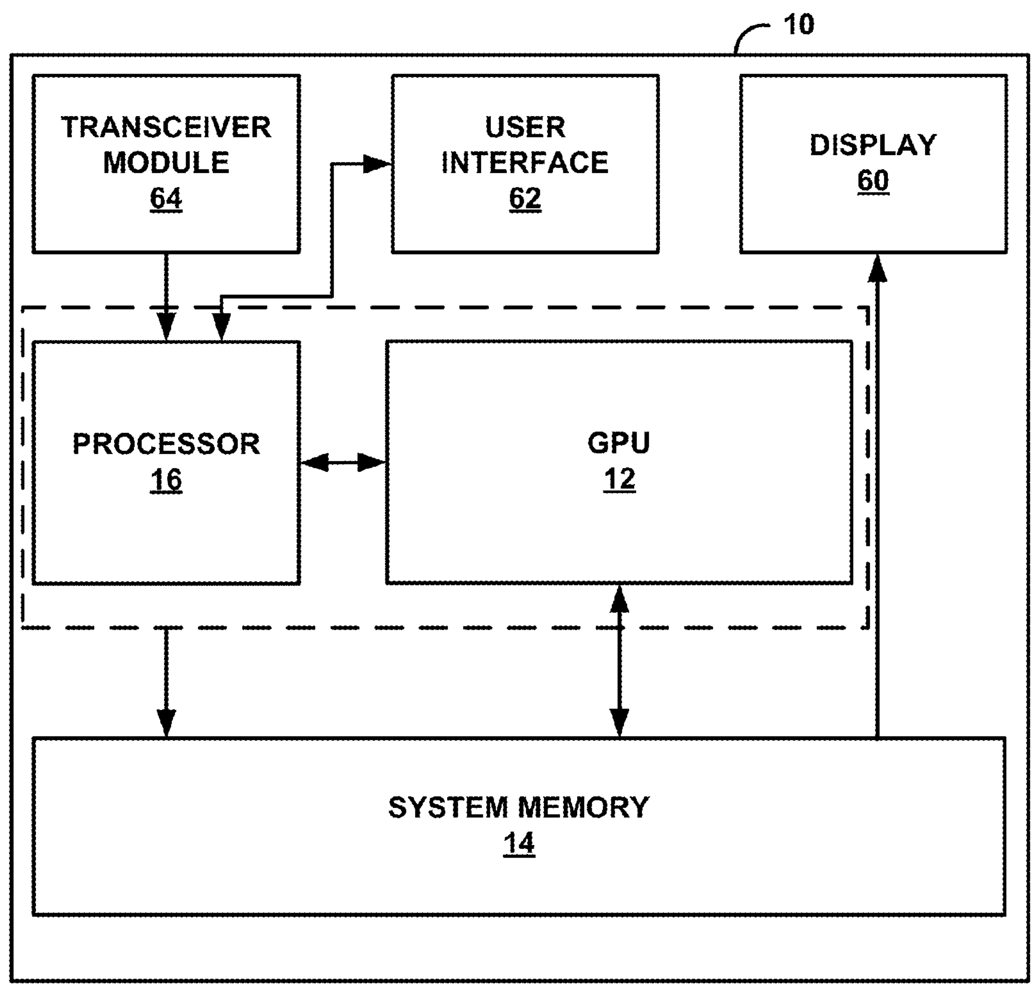
FIG. 4 is a block diagram illustrating a device of FIG. 1 in further detail.

FIG. 4 is a block diagram illustrating a device of FIG. 1 in further detail. For example, FIG. 4 further illustrates device 10. Examples of device 10 include, but are not limited to, wireless devices, mobile telephones, personal digital assistants (PDAs), video gaming consoles that include video displays, mobile video conferencing units, laptop computers, desktop computers, television set-top boxes, tablet computing devices, e-book readers, and the like. Device 10 includes GPU 12, system memory 14, and processor 16. In the example illustrated in FIG. 4, GPU 12 and processor 16 are illustrated in dashed lines to indicate that GPU 12 and processor 16 may be formed in the same integrated circuit. In some examples, GPU 12 and processor 16 may be formed in other integrated circuits (i.e., be in different chips). GPU 12, system memory 14, and processor 16 are described with respect to FIG. 1 and not described further in FIG. 4.

Device 10 may also include display 60, user interface 62, and transceiver module 64. Device 10 may include additional modules or units not shown in FIG. 4 for purposes of clarity. For example, device 10 may include a speaker and a microphone, neither of which are shown in FIG. 4, to effectuate telephonic communications in examples where device 10 is a mobile wireless telephone. Furthermore, the various modules and units shown in device 10 may not be necessary in every example of device 10. For example, user interface 62 and display 60 may be external to device 10 in examples where device 10 is a desktop computer. As another example, user interface 62 may be part of display 60 in examples where display 60 is a touch-sensitive or presence-sensitive display of a mobile device.

Examples of user interface 62 include, but are not limited to, a trackball, a mouse, a keyboard, and other types of input devices. User interface 62 may also be a touch screen and may be incorporated as a part of display 60. Transceiver module 64 may include circuitry to allow wireless or wired communication between device 10 and another device or a network. Transceiver module 64 may include modulators, demodulators, amplifiers and other such circuitry for wired or wireless communication. Display 60 may comprise a liquid crystal display (LCD), a cathode ray tube (CRT) display, a plasma display, a touch-sensitive display, a presence-sensitive display, or another type of display device.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media. In this manner, computer-readable media generally may correspond to tangible computer-readable storage media which is non-transitory. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. It should be understood that computer-readable storage media and data storage media do not include carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of rendering graphical objects or shapes, the method comprising:

determining which surface equations of a plurality of surface equations defined in ray parameters for respective ones of a plurality of implicit surfaces have real-root values, wherein a real-root value for each of the respective surface equations is a value that includes no imaginary component that when substituted into the respective surface equations causes the result of the respective surface equations to equal zero, wherein the plurality of implicit surfaces together form a graphical object or shape, and wherein determining which surface equations for respective ones of the plurality of implicit surfaces have real-root values comprises:

determining which implicit surfaces are uncomplemented surfaces and which implicit surfaces are complemented surfaces, wherein an uncomplemented surface is an implicit surfaces from which another implicit surface is subtracted, and wherein a complemented surface is an implicit surface that is subtracted from another implicit surface; and determining whether surface equations for the complemented surfaces have real-root values and whether surface equations for the complemented surfaces do not have real-root values;

determining a maximum real-root value from among a set of real-root values for the surface equations for the uncomplemented surfaces if the surface equations for the uncomplemented surface do not have real-root values;

determining an intersection point of a ray associated with a pixel with the graphical object or shape based on the determined maximum real-root value; and rendering the pixel based on the determined intersection point.

2. The method of claim 1, further comprising:

receiving the surface equations for the implicit surfaces in form of a Boolean expression, wherein determining which implicit surfaces are uncomplemented surfaces and which implicit surfaces are complemented surfaces comprises determining which implicit surfaces are uncomplemented surfaces and which implicit surfaces are complemented surfaces based on the Boolean expression of the surface equations for the implicit surfaces.

3. The method of claim 1, further comprising:

determining real-root values only for the surface equations of the uncomplemented surfaces if the surface equations for the uncomplemented surfaces have real-root values and the surface equations for the complemented surface do not have real-root values, wherein determining the maximum real-root value from among the set of real-root values comprises determining the maximum real-root value only from among a set of the determined real-root values.

4. The method of claim 1, further comprising:

if the surface equations for at least one of the uncomplemented surfaces do not have real-root values or if the surface equations for at least one of the complemented surfaces has a real-root value:

determining that the ray does not intersect the graphical object or shape; and discarding the pixel from further processing.

5. The method of claim 1, further comprising:

determining a near plane and a far plane of a view frustum, wherein determining which implicit surface are uncomplemented surfaces and which implicit surfaces are complemented surface comprises determining which implicit surfaces are uncomplemented surfaces and which implicit surface are complemented between the near plane and the far plane.

6. The method of claim 1, wherein determining the intersection point of the ray comprises determining the intersection point of the ray without sorting a plurality of possible intersection points to determine the intersection point of the ray.

7. The method of claim 1, wherein determining which surface equations of the plurality of surface equations for respective ones of the plurality of implicit surfaces have real-root values comprises determining, with a fragment shader executing on a graphics processing unit (GPU), which surface equations of the plurality of surface equations for respective ones of the plurality of implicit surfaces have real-root values, and wherein determining the intersection point comprises determining, with the fragment shader executing on the GPU, the intersection point.

8. A device for rendering graphical objects or shapes, the device comprising:

a memory configured to store a plurality of surface equations defined in ray parameters for respective ones of a plurality of implicit surfaces, wherein the plurality of implicit surfaces together form a graphical object or shape; and a graphics processing unit (GPU) configured to:

determine which surface equations have real-root values, wherein a real-root value for each of the respective surface equations is a value that includes no imaginary component that when substituted into the respective surface equations causes the result of the respective surface equations to equal zero, and wherein to determine which surface equations have real-root values, the GPU is configured to:

determine which implicit surfaces are uncomplemented surfaces and which implicit surfaces are complemented surfaces, wherein an uncomplemented surface is an implicit surface from which another implicit surface is subtracted, and wherein a complemented surface is an implicit surface that is subtracted from another implicit surface; and determine whether surface equations for the uncomplemented surfaces have real-root vales and whether surface equations for the complemented surface do not have real-root vales;

determine a maximum real-root value from among a set of real-root values for the surface equation for the uncomplemented surfaces if the surface equations for the uncomplemented surfaces have real-root values and the surface equations for the complemented surfaces do not have real-root values;

determine an intersection point of a ray associated with a pixel with the graphical object or shape based on the determined maximum real-root value; and render the pixel based on the determined intersection point.

9. The device of claim 8, wherein the GPU is configured to:

receive the surface equations for the implicit surfaces in form of a Boolean expression, wherein to determine which implicit surfaces are uncomplemented surfaces and which implicit surfaces are complemented surfaces, the GPU is configured to determine which implicit surfaces are uncomplemented surfaces and which implicit surfaces are complemented surfaces based on the Boolean expression of the surface equations for the implicit surfaces.

10. The device of claim 8, wherein the GPU is configured to:

determine real-root values only for the surface equations of the uncomplemented surfaces if the surface equations for the uncomplemented surfaces have real-root values and the surface equations for the complemented surface do not have real-root values, wherein to determine the maximum real-root value from among the set of real-root values, the GPU is configured to determine the maximum real-root value only from among a set of the determined real-root values.

11. The device of claim 8, wherein, if the surface equations for at least one of the uncomplemented surfaces do not have real-root values or if the surface equations for at least one of the complemented surfaces has a real-root value, the GPU is configured to:

determine that the ray does not intersect the graphical object or shape; and discard the pixel from further processing.

12. The device of claim 8, wherein the GPU is configured to:

determine a near plane and a far plane of a view frustum, wherein to determine which implicit surfaces are uncomplemented surfaces and which implicit surfaces are complemented surfaces, the GPU is configured to determine which implicit surfaces are uncomplemented surfaces and which implicit surfaces are complemented surfaces between the near plane and the far plane.

13. The device of claim 8, wherein the GPU is configured to determine the intersection point of the ray without sorting a plurality of possible intersection points to determine the intersection point of the ray.

14. The device of claim 8, wherein to determine which surface equations have real-root values, the GPU is configured to execute a fragment shader that causes the GPU to determine which surface equations have real-root values, and wherein to determine the intersection point, the GPU is configured to execute the fragment shader that causes the GPU to determine the intersection point.

15. A non-transitory computer-readable storage medium having instructions stored thereon that when executed cause a graphics processing unit (GPU) to:

determine which surface equations of a plurality of surface equations defined in ray parameters for respective ones of a plurality of implicit surfaces have real-root values, wherein a real-root value for each of the respective surface equations is a value that includes no imaginary component that when substituted into the respective surface equations causes the result of the respective surface equations to equal zero, wherein the plurality of implicit surfaces together form a graphical object or shape, and wherein the instructions that cause the GPU to determine which surface equations for respective ones of the plurality of implicit surfaces have real-root values comprise instructions that cause the GPU to:

determine which implicit surfaces are uncomplemented surfaces and which implicit surfaces are complemented surfaces, wherein an uncomplemented surface is an implicit surface from which another implicit surface is subtracted, and wherein a complemented surface is an implicit surface that is subtracted from another implicit surface; and determine whether surface equations for the uncomplemented surfaces have real-root values and whether surface equations for the complemented surfaces do not have real-root values;

determine a maximum real-root value from among a set of real-root values for the surface equations for the uncomplemented surfaces if the surface equations for the uncomplemented surfaces have real-root values and the surface equations for the complemented surface do not have real-root values;

determine an intersection point of a ray associated with a pixel with the graphical object or shape based on the determined maximum real-root value; and render the pixel based on the determined intersection point.

16. The non-transitory computer-readable storage medium of claim 15, further comprising instructions that cause the GPU to:

receive the surface equations for the implicit surfaces in form of a Boolean expression, wherein the instructions that cause the GPU to determine which implicit surfaces are uncomplemented surfaces and which implicit surfaces are complemented surfaces comprise instructions that cause the GPU to determine which implicit surfaces are uncomplemented surfaces and which implicit surfaces are complemented surfaces based on the Boolean expression of the surface equations for the implicit surfaces.

17. The non-transitory computer-readable storage medium of claim 15, further comprising instructions that cause the GPU to:

determine real-root values only for the surface equations of the uncomplemented surfaces if the surface equations for the uncomplemented surfaces have real-root values and the surface equations for the complemented surface do not have real-root values, wherein the instructions that cause the GPU to determine the maximum real-root value from among the set of real-root values comprise instructions that cause the GPU to determine the maximum real-root value only from among a set of the determined real-root values.

18. The non-transitory computer-readable storage medium of claim 15, wherein, if the surface equations for at least one of the uncomplemented surfaces do not have real-root values or if the surface equations for at least one of the complemented surfaces has a real-root value, the instructions cause the GPU to:

determine that the ray does not intersect the graphical object or shape; and discard the pixel from further processing.

19. The non-transitory computer-readable storage medium of claim 15, wherein the instructions cause the GPU to determine the intersection point of the ray without sorting a plurality of possible intersection points.

20. A device for rendering graphical objects or shapes comprising a graphics processing unit (GPU), the GPU comprising:

means for determining which surface equations of a plurality of surface equations defined in ray parameters for respective ones of a plurality of implicit surfaces have real-root values, wherein a real-root value for each of the respective surface equations is a value that includes no imaginary component that when substituted into the respective surface equations causes the result of the respective surface equations to equal zero, wherein the plurality of implicit surfaces together form a graphical object or shape, and wherein the means for determining which surface equations for respective ones of the plurality of implicit surfaces have real-root values comprises:

means for determining which implicit surfaces are uncomplemented surfaces and which implicit surfaces are complemented surfaces, wherein an uncomplemented surface is an implicit surface from which another implicit surface is subtracted, and wherein a complemented surface is an implicit surface that is subtracted from another implicit surface; and means for determining whether surface equations for the uncomplemented surfaces have real-root values and whether surface equations for the complemented surfaces do not have real-root values;

means for determining a maximum real-root value from among a set of real-root values for the surface equations for the uncomplemented surfaces if the surface equations for the uncomplemented surfaces have real-root values and the surface equations for the complemented surface do not have real-root values;

means for determining an intersection point of a ray associated with a pixel with the graphical object or shape based on the determined maximum real-root value; and means for rendering the pixel based on the determined intersection point.

21. The device of claim 20, wherein the GPU further comprises:

means for receiving the surface equations for the implicit surfaces in form of a Boolean expression, wherein the means for determining which implicit surfaces are uncomplemented surfaces and which implicit surfaces are complemented surfaces comprises means for determining which implicit surfaces are uncomplemented surfaces and which implicit surfaces are complemented surfaces based on the Boolean expression of the surface equations for the implicit surfaces.

22. The device of claim 20, wherein the GPU further comprises:

means for determining real-root values only for the surface equations of the uncomplemented surfaces if the surface equations for the uncomplemented surfaces have real-root values and the surface equations for the complemented surface do not have real-root values, wherein the means for determining the maximum real-root value from among the set of real-root values comprises means for determining the maximum real-root value only from among a set of the determined real-root values.

23. The device of claim 20, further comprising:

means for determining a near plane and a far plane of a view frustum, wherein the means for determining which implicit surfaces are uncomplemented surfaces and which implicit surfaces are complemented surfaces comprises means for determining which implicit surfaces are uncomplemented surfaces and which implicit surfaces are complemented surface between the near plane and the far plane.

24. The device of claim 20, wherein the means for determining the intersection point of the ray comprises means for determining the intersection point of the ray without sorting a plurality of possible intersection points to determine the intersection point of the ray.

* * * * *